United States Patent [19]
Henshaw

[11] Patent Number: 5,861,953
[45] Date of Patent: Jan. 19, 1999

[54] OPTO-ELECTRONIC SCALE READING APPARATUS WITH DIFFERING OPTICAL PATH LENGTHS

[75] Inventor: James R Henshaw, Stroud, United Kingdom

[73] Assignee: Renishaw PLC, Gloucestershire, United Kingdom

[21] Appl. No.: 687,496

[22] PCT Filed: Dec. 8, 1995

[86] PCT No.: PCT/GB95/02864

§ 371 Date: Aug. 6, 1996

§ 102(e) Date: Aug. 6, 1996

[87] PCT Pub. No.: WO96/18868

PCT Pub. Date: Jun. 20, 1996

[30] Foreign Application Priority Data

Dec. 10, 1994 [GB] United Kingdom ............... 9424969

[51] Int. Cl.[6] .................................................. G01B 9/02
[52] U.S. Cl. .................................. 356/356; 250/237 G
[58] Field of Search ................................ 356/356, 354, 356/345; 250/237 G

[56] References Cited

U.S. PATENT DOCUMENTS

| 4,636,076 | 1/1987 | Pettigrew . |
| 4,959,542 | 9/1990 | Stephens . |
| 4,974,962 | 12/1990 | Stephens et al. . |

FOREIGN PATENT DOCUMENTS

| A-0 387 520 | 9/1990 | European Pat. Off. . |
| A-0 543 513 | 5/1993 | European Pat. Off. . |
| A-26 05 670 | 8/1977 | Germany . |
| C-33 22 738 | 10/1984 | Germany . |
| A-39 05 838 | 8/1989 | Germany . |
| B2-3-49370 | 7/1991 | Japan . |
| 1 474 049 | 5/1977 | United Kingdom . |
| B-2 216 257 | 10/1989 | United Kingdom . |
| WO 89/05964 | 6/1989 | WIPO . |

*Primary Examiner*—Robert Kim
*Attorney, Agent, or Firm*—Oliff & Berridge, PLC

[57] ABSTRACT

A readhead (18) measures movement in the direction of arrow (20) with respect to a scale (10). The readhead (18) comprises an index grating (12), which interacts with light from the scale (10) to produce fringes in the vicinity of an analyzer grating (14). The resulting light modulations are detected by photodetectors (16). In order to reduce the sensitivity of the apparatus to changes in the ride height (h) of the readhead above the scale, at least two different optical path lengths are provided for light travelling from the scale (10) to the index grating (12), and/or from the index grating (12) to the analyzer (14). Various ways to achieve this are disclosed, e.g. a plate (22) of a refractive medium placed in one optical path, or tilting one of the gratings.

8 Claims, 7 Drawing Sheets

OPTO-ELECTRONIC SCALE READING APPARATUS WITH DIFFERING OPTICAL PATH LENGTHS

FIELD OF THE INVENTION

This invention relates to opto-electronic scale reading apparatus. Such apparatus nay be used with a scale to determine the magnitude and direction of movement of one member relative to another. Such an apparatus is typically used to measure the relative movement of two members on coordinate positioning machines such as machine tools or coordinate measuring machines.

DESCRIPTION OF PRIOR ART

A known type of such device is described in U.S. Pat. No. 4,959,542. Here, an elongate scale which can be fitted to one of the above members comprises a series of marks, in the form of parallel lines, spaced apart in the longitudinal direction of the scale. A readhead for attachment to the other of the members includes an index grating and an analyser grating. Light reflected from (or transmitted through) the scale interacts with the index grating, and causes the generation of a fringe pattern in the plane of the analyser grating. When the scale and readhead are moved relative to each other, this fringe pattern moves in a corresponding fashion in the plane of the analyser grating, and photodetectors situated behind the analyser grating receive a modulated light signal, from which the distance and direction moved can be determined.

Alternatively, our European Patent Application No. EP 543513 discloses that the analyser grating and the detectors may be combined, and provided on a single semiconductor substrate. This combined grating and detector may be referred to as an electrograting.

The arrangement of U.S. Pat. No. 4,959,542 provides a spatial filtering effect which ensures that the readhead is very tolerant of defects in the scale or dirt which may accumulate on the scale. However, to ensure that fringes with good contrast are produced in the plane of the analyser grating, it is necessary to hold the spacings between the scale, the index grating and the analyser grating substantially in accordance with formulae which are given in the specification of U.S. Pat No. 4,959,542. These formulae relate those spacings to the pitches of the scale, the index grating and the analyser grating.

Figure 1:
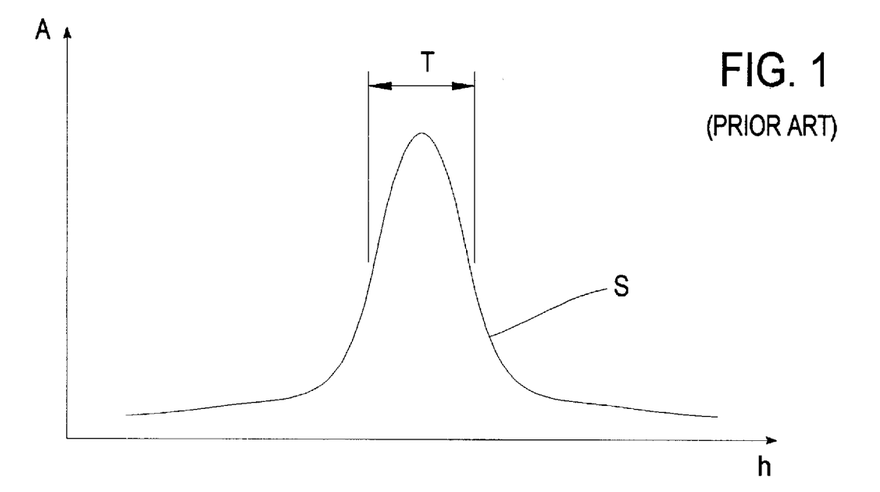
FIG. 1 is a graph showing the sensitivity of a prior art readhead to the ride height above a scale.

As a result, it is found in practice that the readhead is fairly sensitive to the offset or "ride height" between the scale and the readhead. This is illustrated in FIG. 1 of the accompanying drawings, which shows a sensitivity curve S illustrating how the amplitude A of the signal output from the readhead varies with the offset or ride height h of the readhead above the scale. It will be seen that a strong, usable signal is obtained only within a relatively narrow tolerance band T. When the scale and readhead is installed on a machine, therefore, it is necessary to ensure that the readhead will remain within this tolerance band T throughout the length of its travel along the scale.

British Patent No. 1,474,049 shows scales and readheads of a type which is different from those discussed above. In one embodiment, light passes from a first grating to a second grating, which reflects it back to the first grating. The second grating is tilted with respect to the first grating so that the return optical path from the second grating to the first is greater than the outward optical path from the first grating to the second. U.S. Pat. No. 4,636,076 shows a development, in which the return optical path differs from the outward optical path by virtue of the light passing through different thicknesses of a material having a refractive index different from the ambient medium. However, these two patents do not address the problems with which the present invention is concerned.

SUMMARY OF THE INVENTION

The present invention provides a scale and readhead apparatus, comprising:
 an elongate scale defined by a series of marks spaced apart in the longitudinal direction;
 a readhead comprising an index grating and an analyser, light travelling from the scale to the index grating and analyser;
 characterised in that at least two different optical path lengths are provided for light travelling from the scale to the index grating, and/or from the index grating to the analyser.

With such an arrangement, light from the scale may interact with the index grating and cause a fringe pattern in the vicinity of the analyser. However, by virtue of the different optical path lengths (which vary across the field of view of the analyser), for a given ride height of the readhead above the scale, only the fringe pattern caused by light travelling along one of the optical paths coincides with the analyser to give a good output signal. At another given ride height, the fringe pattern caused by light travelling along another one of the optical paths coincides with the grating to give a good output signal. Thus, good output signals are provided at more than one ride height.

BRIEF DESCRIPTION OF THE DRAWINGS

Preferred embodiments of the invention will now be described by way of example, and with reference to the accompanying drawings, wherein.

DESCRIPTION OF PREFERRED EMBODIMENTS

Figure 3:
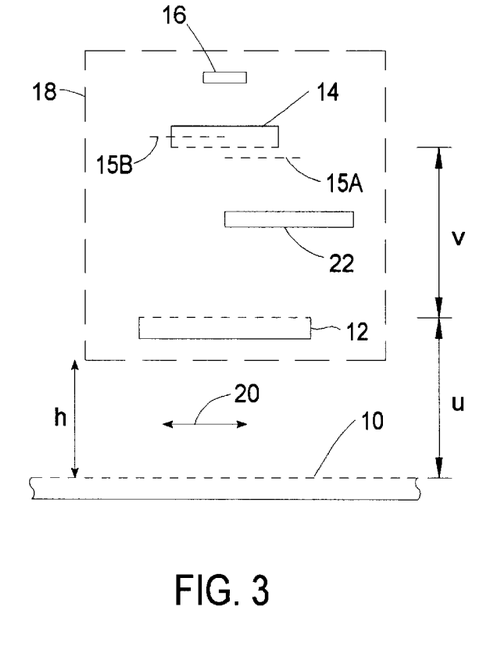
FIGS. 3–18 are schematic longitudinal sectional views through scales and readheads according to various embodiments of the invention.

FIG. 3 shows a scale 10, index grating 12, analyser grating 14 and one or more photodetectors 16. The scale comprises a series of marks, in the form of parallel lines, spaced apart in the longitudinal direction of the scale. The index and analyser gratings 12,14 and the photodetectors 16 are provided as a unit in a readhead 18 (together with a lens and a light source for illuminating the scale, neither of which is shown). The arrangement is generally as disclosed in U.S. Pat. No. 4,959,542.

In that patent, it is described that the spacings between the scale, index grating and analyser are related to the pitches of the marks or lines of these optical elements by certain formulae. This causes the light reflected from the marks on the scale to interact with the index grating to form fringes in the plane of the analyser grating. These fringes move in accordance with relative longitudinal movement between the scale and the readhead, and this can be detected in several ways.

For example, the analyser may be slightly skewed relative to the index grating, within its own plane (which still remains parallel to the index grating). The fringes formed in the plane of the analyser then in turn interact with the analyser to generate moire fringes. There may then be three or four photodetectors 16, arranged transversely with respect to the scale in order to detect the moire fringes. Their outputs may be combined in such a way as to give two signals in quadrature.

Alternatively, the analyser 14 and photodetectors 16 may be combined and provided on a single semiconductor substrate in the form of an electrograting, as described in European Patent Application No. EP 543513. Such an electrograting comprises a linear array of narrow, finely spaced photodetectors which take the place of a conventional grating. Interdigitated sets of the photodetectors are each connected in common to provide the required output signals. As stated in EP 543513, the electrograting may also include integral light sources, or a separate light source may be provided. A lens in the readhead is not necessary.

The readhead 18 rides at a height h above the scale 10 as it travels longitudinally along the scale in the direction indicated by arrows 20. If the readhead 18 consisted only of the gratings 12,14 and detectors 16 as described thus far, then it would be fairly intolerant of changes in this ride height h as shown in FIG. 1 and discussed above.

Figure 19:
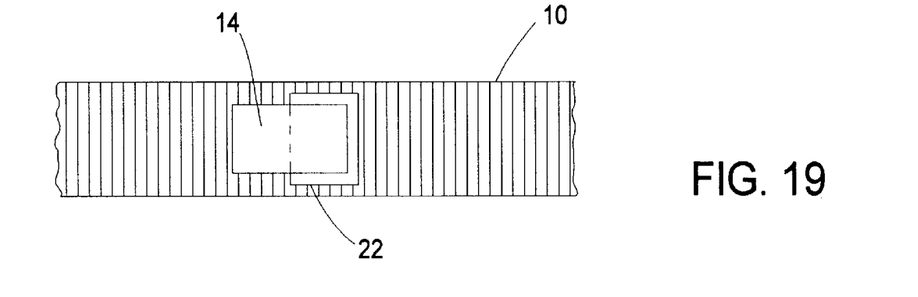
FIG. 19 is a plan view of the scale and readhead according to FIG. 3.

To ameliorate this problem, FIG. 3 shows a plate 22 of a transparent refractive medium inserted between the index grating 12 and the analyser grating 14. However, this plate 22 covers only half of the working area or aperture of the analyser grating 14, as seen also in the plan view of FIG. 19. Because it has a different refractive index from the surrounding air, the plate 22 means that the optical path length between the scale 10 and the analyser 14 on the right hand side of the analyser (as seen in FIGS. 3 and 19) differs from that on the left hand side. In consequence, the plane 15A of the fringes formed by the interaction between the scale and the index grating on the right hand side of these figures differs from the plane 15B of the corresponding fringes on the left hand side.

Another way to view this is to consider the ratio u/v, where u is the optical path length from the scale 10 to the index grating 12, and v is the optical path length from the index grating 12 to the analyser 14. Because the plate 22 on the right hand side of FIGS. 3 and 19 has a larger refractive index than the air in the corresponding position on the left hand side, the optical length v is larger on the right hand side. Thus, the ratio u/v is different on the right hand side, compared with the left hand side.

Figure 2:
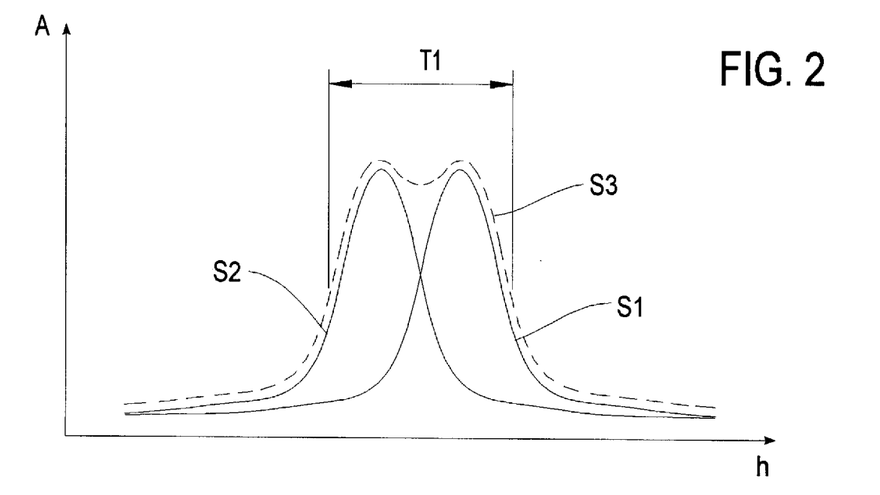
FIG. 2 is a graph similar to FIG. 1, but showing the ride height sensitivity of an embodiment of the present invention.

This affects the ride height sensitivity in the manner shown in FIG. 2. In place of the ride height sensitivity curve S shown in FIG. 1, we now have two such curves, S1 and S2. One of these curves corresponds to the optical path length on the right hand side of FIG. 3, i.e. when the ride height h is such that the fringes in the plane 15A coincide with the plane of the analyser 14. The other curve corresponds to the optical path length on the left hand side, i.e. when the ride height h is such that the fringes in the plane 15B coincide with the plane of the analyser 14. Each of these curves has a smaller height than the curve S in FIG. 1, but the overall sensitivity of the readhead is now as shown by the broken line S3.

It can be seen that this overall sensitivity curve S3 is broader than that in FIG. 1, even though it is not as high. The result, therefore, is that the readhead gives useable signals over a tolerance band T1 which is wider than the tolerance band T. In other words, the readhead is less sensitive to changes in the ride height h compared with the prior art arrangement. It will be noted that the plane in which the fringes are formed no longer needs to coincide exactly with the plane of the analyser, but rather the planes 15A, 15B are merely in the vicinity of the plane of the analyser 14.

The photodetector or photodetectors 16 should have a width (in the longitudinal direction) sufficient to straddle both of the optical paths, so as to detect the light signals from the fringes in both optical paths in common and produce an output signal which combines the light signals. However, if the fringes in the planes 15A, 15B are detected by producing moire fringes, then the detectors should not be so wide as to be unable to distinguish these moire fringes. Alternatively, there may be a detector or a set of detectors for each of the optical paths, their outputs being combined so as to detect the light signals in the two optical paths in common. If an electrograting according to EP 543513 is used, then the array of interconnected photodetectors will automatically straddle the two optical paths and detect the light signals in these paths in common.

Figure 4:
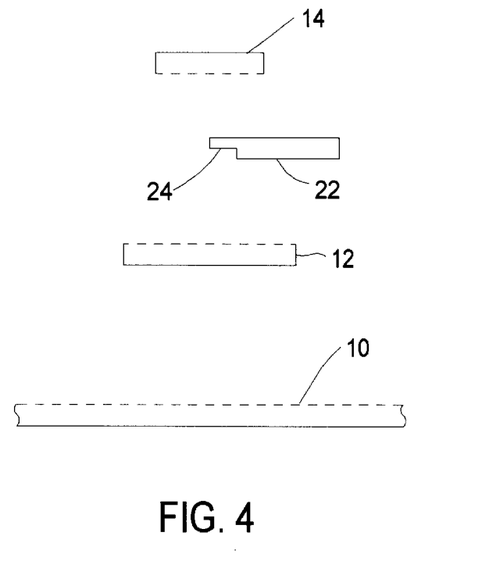

FIG. 4 shows an alternative arrangement, in which the refractive plate 22 is provided with a step in a region 24. Effectively, there are now three different optical path lengths between the scale 10 and the analyser grating 14, namely on the left hand side of the Figure (where there is no plate 22); in the central, stepped region 24 (where the plate 22 is relatively thin); and on the right hand side of the Figure (where the plate 22 is thicker). This has the effect of adding another peak to the peaks S1 and S2 in FIG. 2. It will be appreciated that if one merely made the plate 22 of FIG. 3 thicker, without a stepped region 24, then the peaks S1 and S2 in FIG. 2 would be further apart, broadening the tolerance band T1, but creating a significant dip in the overall sensitivity S3 between the two peaks S1 and S2. The effect of the stepped region 24 is to provide a third peak which fills this dip.

Figure 5:
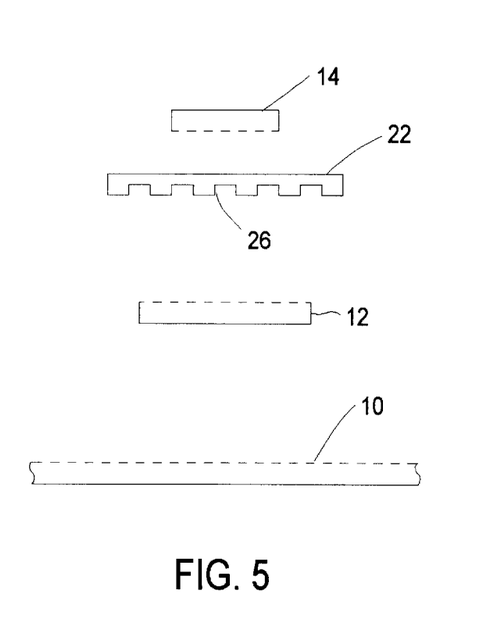
Figure 6:
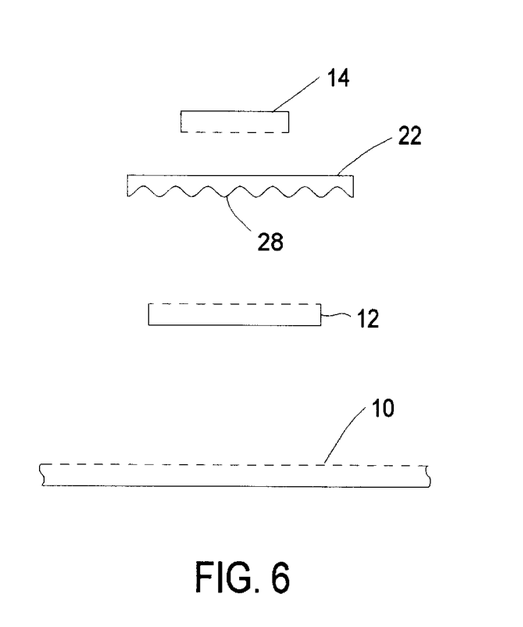

FIG. 5 shows another arrangement. Here, the plate 22 extends across the entire width of the analyser grating 14, but has a castellated profile 26. FIG. 6 shows a similar arrangement, but with an undulating or ribbed profile 28. In both FIGS. 5 and 6, the castellations or ribs should have a pitch much greater than the scale and the gratings 12,14, to prevent diffraction and interference effects.

Figure 7:
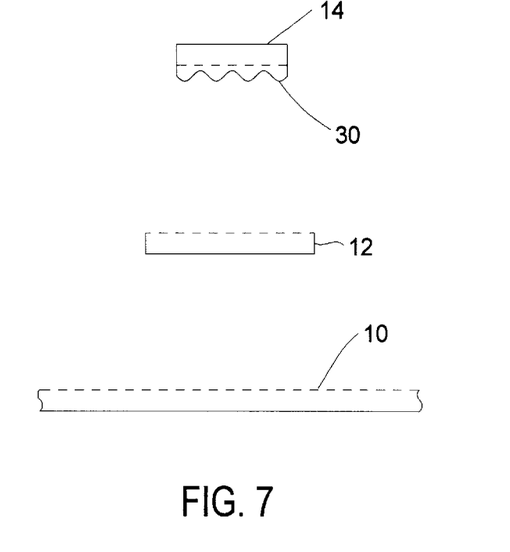

FIG. 7 shows an alternative, in which a refractive medium 30 having a varying thickness is deposited over the surface of the analyser 14. In a similar manner, such a coating 30 may be provided over a conventional analyser grating. These configurations may be more advantageous than that of FIG. 6, since the normal operation of the readhead is less likely to be impaired by refraction at the undulating surface.

Figure 8:
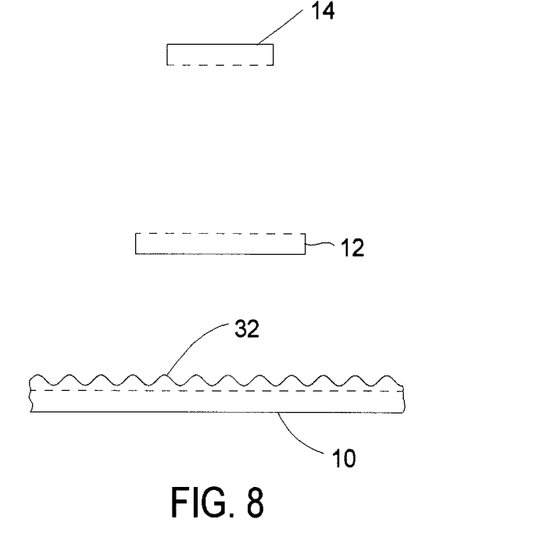

FIG. 8 shows that a refractive medium of varying thickness may instead be deposited on the surface of the scale 10. Once again, in any of these cases, the undulations in the thickness of the refractive medium 30,32 should be on a much larger scale than the pitch of the scale and the gratings, to avoid diffraction and interference effects.

Figure 9:
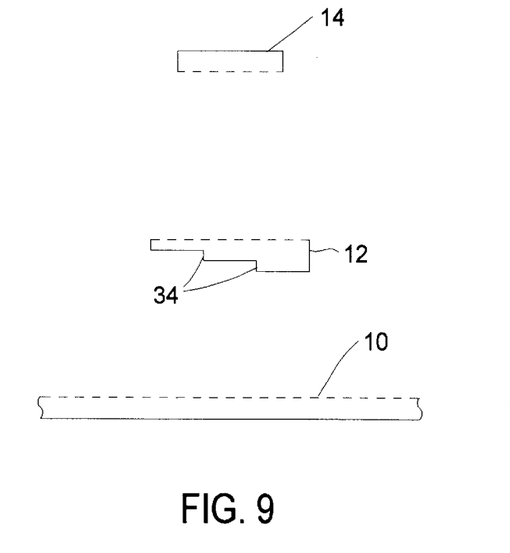

FIG. 9 shows an alternative in which the substrate of the index grating 12 is formed with steps 34, giving the same effect as the insertion of the plate 22 in FIGS. 3 and 4. There may be any suitable number of such steps 34.

Figure 10:
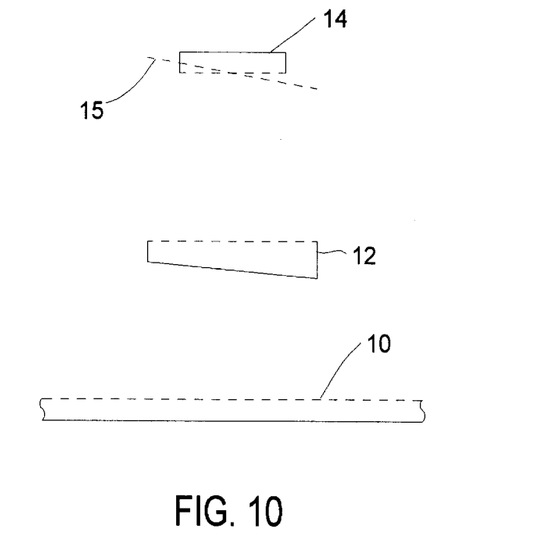

FIG. 10 shows how the same effect can be achieved by having an index grating substrate which is wedge-shaped, i.e. having a continually varying thickness instead of a stepped thickness. This results in a fringe plane 15 which is tilted with respect to the analyser 14. For different ride heights, a different point on the analyser 14 will coincide with the plane 15 of the fringes.

Figure 11:
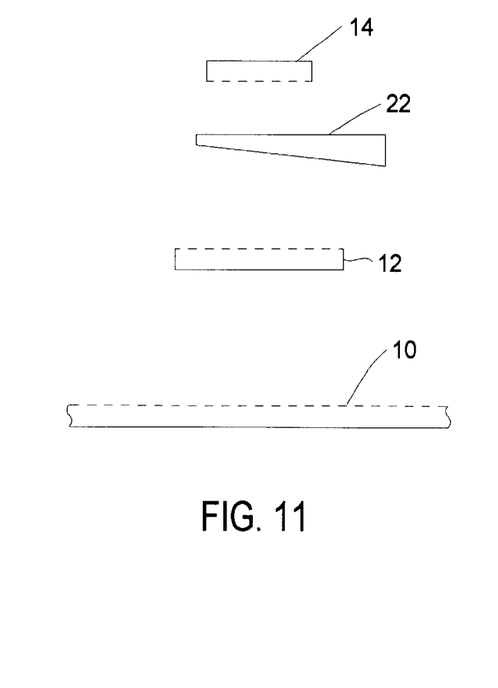
Figure 12:
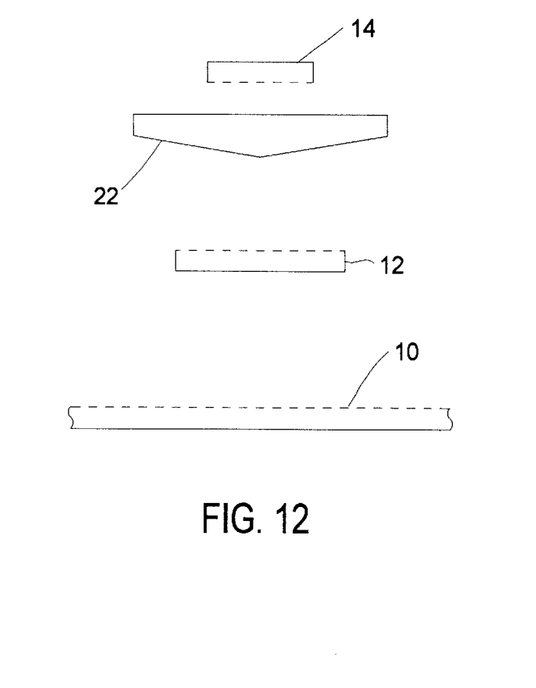

FIG. 11 shows a similar arrangement, but using a wedge-shaped refractive plate 22 between the index grating 12 and the analyser grating 14. FIG. 12 shows the same arrangement, but the plate 22 is now in the form of a biprism or double wedge.

Figure 13:
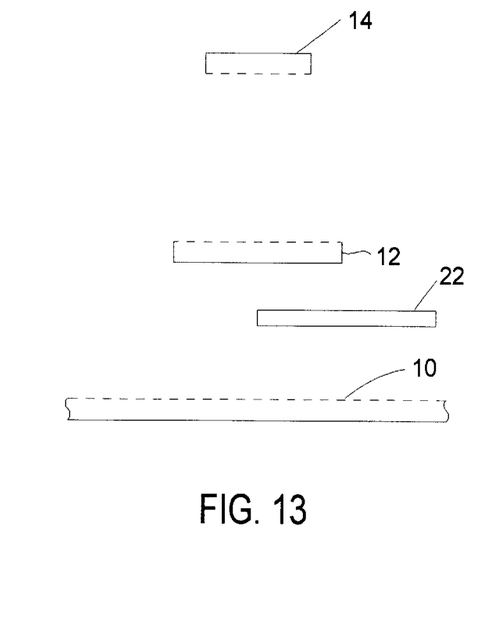

Of course, it is possible to insert the plate 22 of FIG. 3 between the scale 10 and the index grating 12 instead of between the index grating 12 and the analyser 14. This is illustrated in FIG. 13. Any of the plates 22 shown in FIGS. 4, 5, 6, 11 or 12 may similarly be inserted between the scale 10 and the index grating 12. The effect is to vary the optical length u (FIG. 3) instead of the optical length v.

Figure 14:
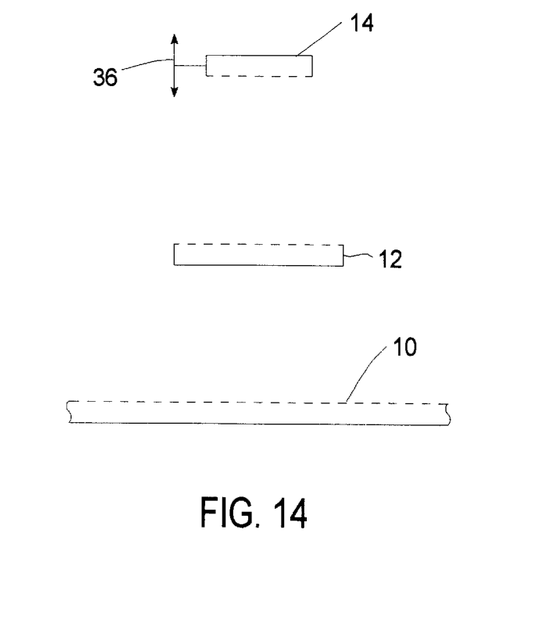

FIG. 14 shows another embodiment. Instead of varying the optical path length in different regions of the analyser grating 14, the analyser 14 is instead vibrated or oscillated towards and away from the index grating 12, as indicated by the arrows 36. Thus, we now have different optical paths at different times, rather than in different regions. The vibration may be achieved by, for example, a small motor or a piezoelectric actuator. The frequency of the vibration should be substantially higher than the frequency of the light modulations produced by the movement of the scale relative to the readhead, so that the signals over one or more cycles of the vibration can be integrated (e.g. by a suitable filter circuit). This ensures that the light signals from the different optical path lengths (i.e. at different times) are detected in common, as previously. The effect of this vibration is that the single sensitivity peak S (and the corresponding tolerance band T) in FIG. 1 vibrates in the horizontal direction of that Figure, giving an effective broadening of the ride heights h to which the readhead is responsive.

Figure 15:
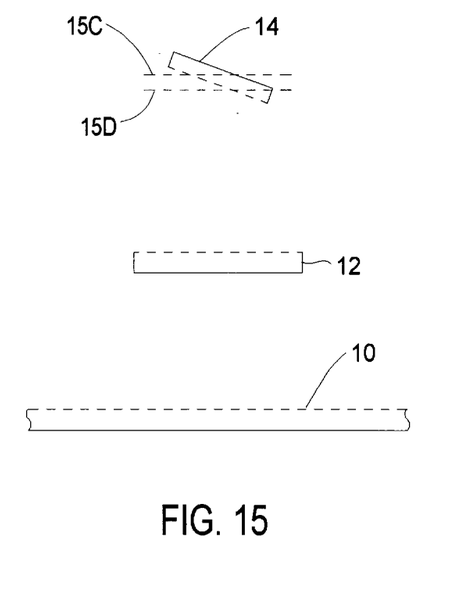
Figure 16:
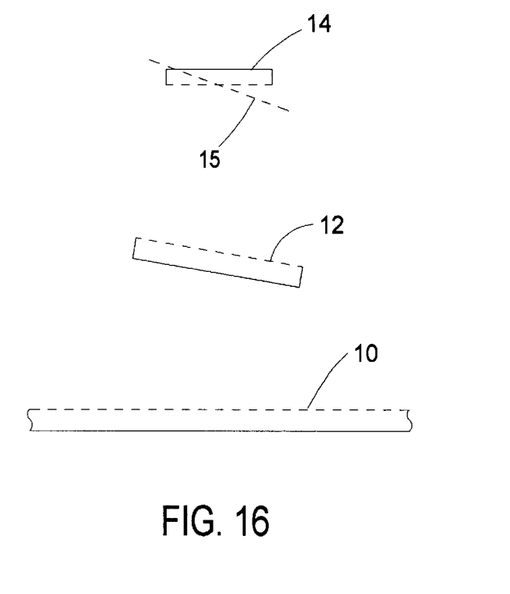
Figure 17:
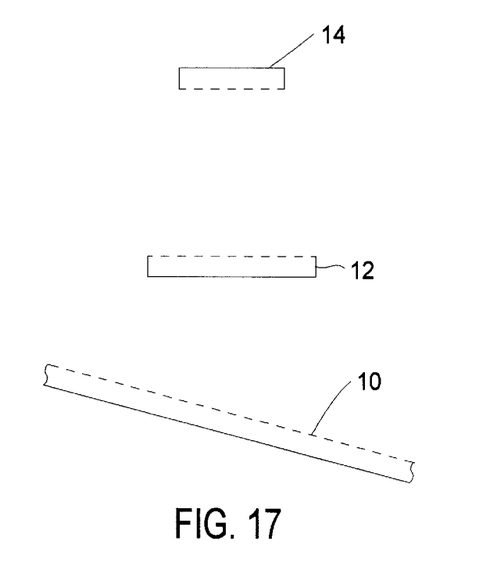

FIGS. 15–17 illustrate further embodiments. Here, an optical path length ratio u/v which varies gradually from the left hand side to the right hand side of the analyser is achieved by deliberately tilting one of the elements so that its plane is no longer parallel to the others.

In FIG. 15 the analyser 14 is tilted. At one ride height of the readhead above the scale, fringes will formed in the plane 15C; while at another ride height they will be formed in the plane 15D. These and similar planes each coincide with a different point on the tilted analyser, so that good signals can be produced from the region around the point of coincidence for various different ride heights.

In FIG. 16 the index grating 12 is tilted. This results in the plane 15 of the fringes also being tilted. Again, for different ride heights, a different point on the analyser 14 will coincide with the plane 15 of the fringes. A similar effect is achieved in FIG. 17, in which the scale 10 is tilted. The tilting of the scale 10 in FIG. 17 may in practice be most conveniently achieved by tilting the entire readhead relative to the scale.

In FIGS. 4–17, the photodetector or photodetectors have been omitted for simplicity. However, it will be understood that, as in FIG. 3, they may be provided behind the analyser grating 14, or alternatively an electrograting may be used as the analyser 14. The above comments about detecting the signals from the various optical paths in common should be observed.

Figure 18:
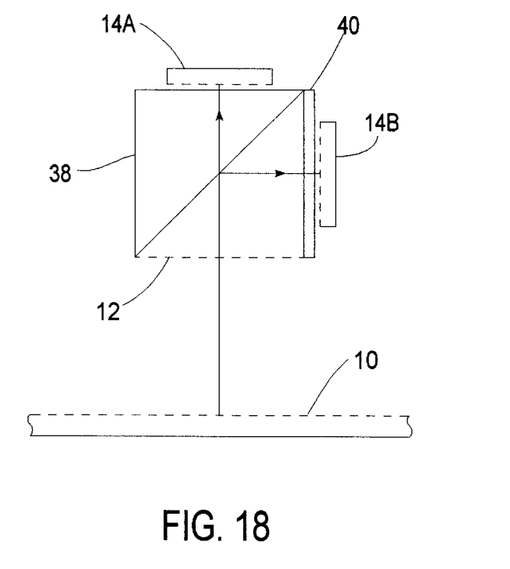

A further embodiment is shown in FIG. 18. Here, the index grating 12 is provided on the underside of a beam splitter cube 38. Two separate analyser gratings (and the corresponding detectors) or two separate electrogratings 14A, 14B are provided, respectively receiving the split beams produced by the beam splitter 38. The detectors of the analysers 14A, 14B are connected to the signal processing circuit of the readhead in parallel, to detect the light signals in common. To produce the required differing optical path lengths, one of the analysers 14B may be located further from the centre of the cube than the other analyser 14A. Desirably, the optical path difference can be accentuated by inserting a layer 40 of a refractive medium such as glass before the analyser 14B. This layer 40 may suitably be formed on the surface of the cube 38.

The embodiments described above have been illustrated by sectional views taken in the longitudinal direction of the scale 10. Thus, the optical path length varies for different positions in this longitudinal direction. For example, FIG. 19 shows how the plate 22 of FIG. 3 covers the analyser grating 14 for only part of its longitudinal extent. Nevertheless, it is equally possible for the optical path length to vary with the transverse position, instead of the longitudinal position.

Figure 20:
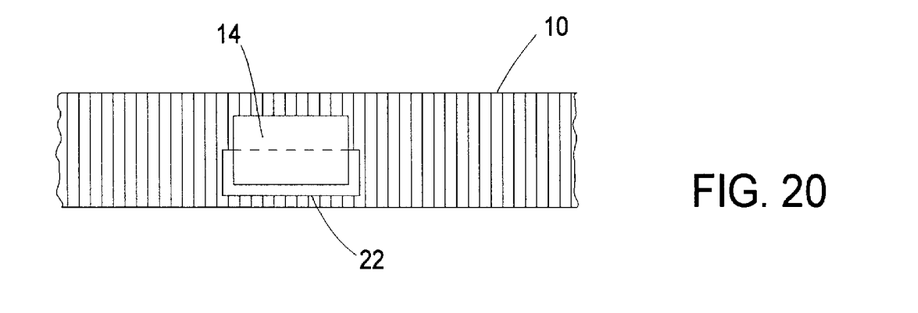
FIG. 20 is a plan view corresponding to FIG. 19 but showing a modification.

For example, FIG. 20 is a plan view of a modification of the arrangement of FIGS. 3 and 19. The refractive plate 22 in FIG. 20 is inserted between the scale 10 and the analyser grating 14 in such a manner as to cover the grating 14 for only part of its transverse extent, rather than for part of its longitudinal extent. The arrangements of FIGS. 4–13 and 15–18 may be modified similarly. For example, the steps, castellations and ribs of FIGS. 4–9, the wedge profiles of FIGS. 10–12, and the beam splitter of FIG. 18, may each be turned through 90°.

In the case of FIGS. 15–17, it will be appreciated that the required tilting was shown as the deliberate introduction of a pitch angle between the tilted element and the other elements, giving the variation in optical path length in the longitudinal direction. It will be understood that the optical path length may be made to vary in the transverse direction by introducing a deliberate roll angle to the appropriate element instead of a deliberate pitch angle.

Figure 22:
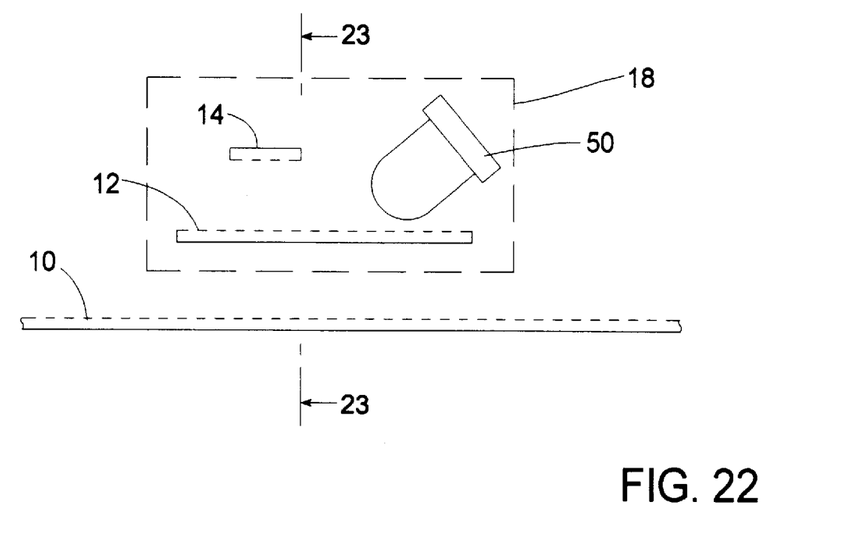
FIG. 22 is a schematic longitudinal sectional view through a further embodiment.
Figure 23:
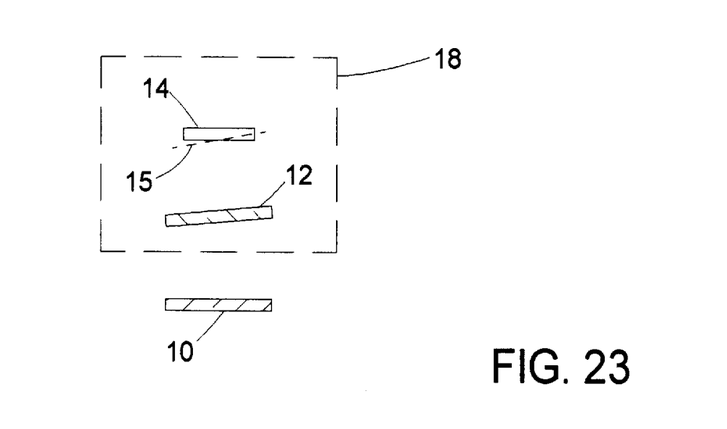
FIG. 23 is a transverse section on the line A—A in FIG. 22.

One example of this is illustrated in FIGS. 22–23. Here, as seen in FIG. 23, the index grating 12 is tilted with a suitable roll angle, producing fringes in a tilted plane 15. The analyser 14 is an electrograting according to EP 543513. A separate light source 50 is provided, in the form of an infra-red light emitting diode. This could illuminate the scale 10 directly, as in the other embodiments, but for convenience of design and manufacture it is arranged to illuminate it via the index grating 12. By locating the light source close to the index grating it is possible to prevent fringes from forming on the scale itself. It will be seen from FIG. 22 that the light source 50 provides the illumination obliquely from one end. This is ideal when the scale has a profile as shown in U.S. Pat. No. 4,974,962, where the scale marks have facets which reflect the light vertically towards the index grating 12 and analyser 14.

Figure 21:
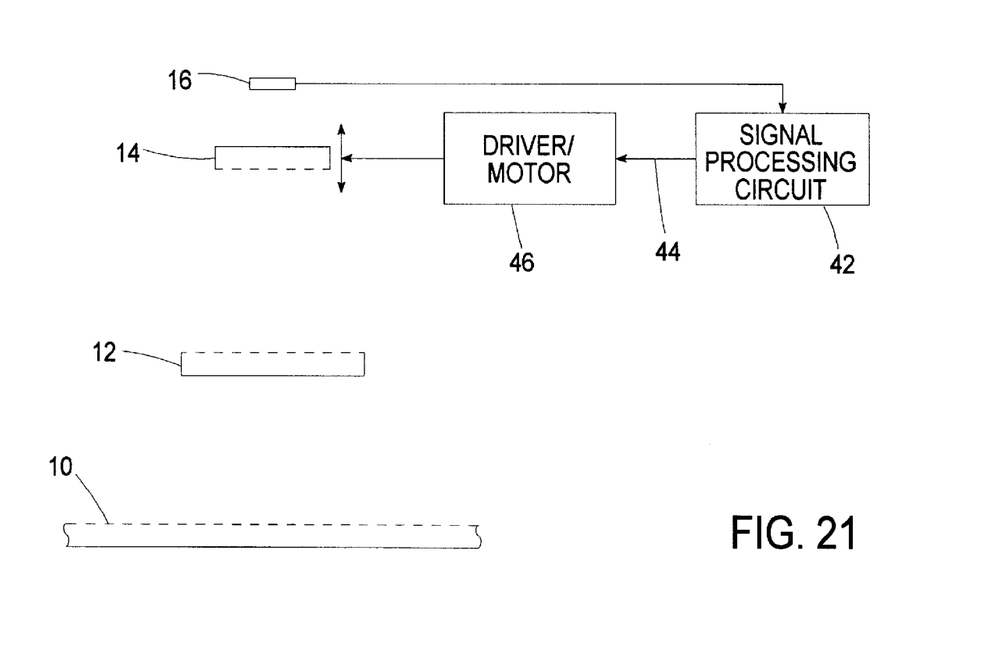
FIG. 21 is a schematic sectional view and block diagram of another embodiment.

FIG. 21 shows yet another embodiment. Like FIG. 14, the optical path length is here varied by moving the analyser grating 14 towards and away from the scale 10. Thus, there are different optical paths at different times, instead of in different regions. Rather than the continuous vibration of FIG. 14, however, the optical path length is varied by a servo loop. The outputs from the detectors 16 are processed in a signal processing circuit 42, which (amongst other outputs) produces an output 44 which varies with the amplitude or intensity of the outputs from the detectors 16. This output may be produced by rectifying and smoothing the relevant output signals, and combining them together. Alternatively, it may be produced by rectifying and smoothing the outputs of just one of the detectors 16. The signal 44 is used to control a servo driver and motor 46, which adjusts the position of the analyser grating 14 in such a manner as to tend to keep the output signals from the detectors 16 at maximum amplitude or intensity. The effect will be that, if for example the ride height h between the readhead and the scale 10 decreases then the analyser grating 14 will move closer to the index grating 12 to compensate. This action will tend to keep the spacings between the scale, the index and the analyser gratings in accordance with the desirable relationships explained in U.S. Pat. No. 4,959,542.

I claim:

1. Opto-electronic scale and readhead apparatus, comprising:

an elongate scale defined by a series of marks spaced apart in the longitudinal direction;

a readhead for movement in the longitudinal direction of the scale, spaced therefrom by a ride height, the readhead comprising an index grating and an analyser, light travelling from the scale to interact with the index grating, thereby producing fringes in the vicinity of the analyser for analysis by the analyzer;

characterised in that at least two optical paths are provided, having different optical path lengths from the scale to the index grating, and/or from the index grating to the analyser; and for a first given ride height of the readhead above the scale, fringes caused by light travelling along a first one of the optical paths coincide with the analyser; and fringes travelling along a second one of the optical paths do not coincide with the analyser, while for a second given ride height of the readhead above the scale, fringes caused by light travelling along the second optical path coincide with the analyser, and fringe traveling along the first optical path do not coincide with the analyser.

2. Apparatus according to claim 1, having at least one photodetector arranged for detecting light from said different optical paths in common.

3. Apparatus according to claim 1, wherein the analyser is in the form of a semiconductor device comprising a plurality of photodetectors.

4. Apparatus according to claim 1, wherein an element of a transparent refractive material is located in at least one of said optical paths, to provide different optical path lengths in said optical paths.

5. Apparatus according to claim 4, wherein said refractive element has a different thickness in different ones of said optical paths.

6. Apparatus according to claim 1 wherein one of the scale, the index grating and the analyser is tilted so as to be non–parallel to the others, to provide different optical path lengths in said optical paths.

7. Apparatus according to claim 6, wherein the index grating is tilted so as to be non-parallel to the scale and the analyser, to provide said different optical path lengths.

8. Apparatus according to claim 1, wherein:

the ratio u/v in one of said optical paths differs from the ratio u/v in another of said optical paths, where u is the optical path length from the scale to the index grating, and v is the optical path length from the index grating to the analyzer.

* * * * *